June 10, 1930.  W. C. H. JOINER, JR  1,763,524
CLOSET
Filed June 13, 1929  3 Sheets-Sheet 1

Inventor:
W. C. H. Joiner Jr.
By Monroe E. Miller
Attorney.

June 10, 1930.  W. C. H. JOINER, JR  1,763,524
CLOSET
Filed June 13, 1929  3 Sheets-Sheet 2

Inventor:
W. C. H. Joiner Jr.
By Monroe E. Miller
Attorney.

June 10, 1930.  W. C. H. JOINER, JR  1,763,524
CLOSET
Filed June 13, 1929    3 Sheets-Sheet 3

Inventor:
W. C. H. Joiner Jr.
By Monroe E. Miller
Attorney.

Patented June 10, 1930

1,763,524

UNITED STATES PATENT OFFICE

WILLIAM C. H. JOINER, JR., OF CAMDEN, NEW JERSEY

CLOSET

Application filed June 13, 1929. Serial No. 370,630.

The present invention relates to closets, and aims to provide a combination bowl and tank constructed as a unit.

Another object of the invention is the provision of a closet bowl having an ejector to expedite the discharge of the water therefrom.

Another object is the provision of novel means for delivering the water from the tank to the bowl for the flushing action.

Another object is the provision of a combination tank and bowl wherein the bottom of the tank or the water outlet thereof may be located below the normal water level in the bowl, provision being made for raising the water from the tank to discharge into the bowl.

Still another object is the provision of novel means for controlling the flow of water into the tank and bowl.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
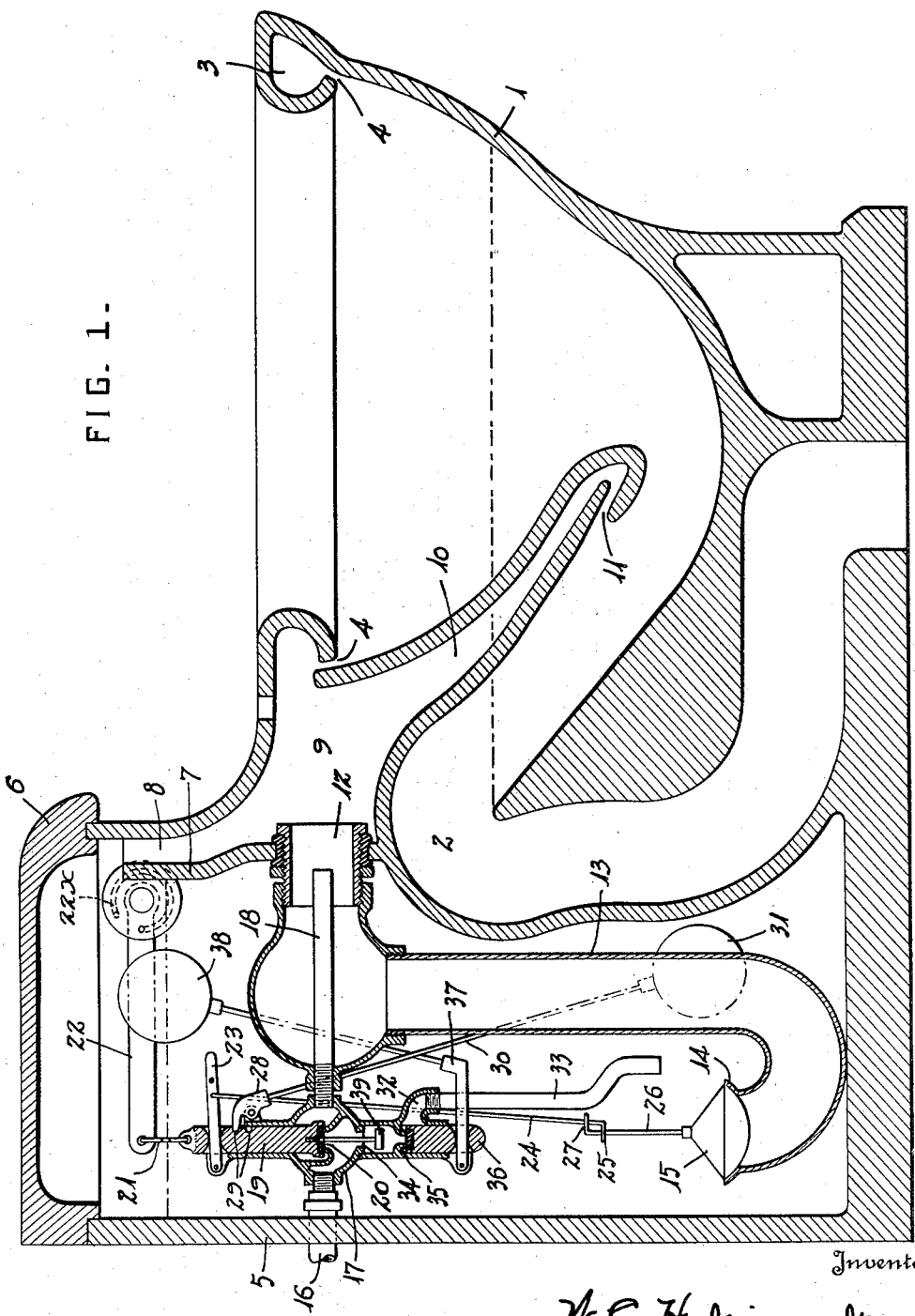
Figure 1 is a vertical section of one embodiment of the invention.

Referring to Fig. 1, 1 indicates the bowl, and 2 the outlet trap from which the outlet may lead in any direction (downwardly as shown). The bowl 1 has the hollow flushing rim 3 with a continuous discharge slot 4 at the wall of the bowl.

The flush tank 5 is constructed integrally with the bowl 1 and trap 2, and same may be of vitreous china earthenware or other suitable material, the tank having a removable top 6 permitting access to the parts within the tank.

The tank has a partition 7 therein rising from the trap 2, as shown, and providing an overflow passage 8 leading to the inlet cavity 9 of the bowl, so that if, for any reason, the water continues to enter the tank it may overflow over the partition 7 and down the passage 8 into the bowl.

The bowl 1 has a jet passage 10 leading downwardly from the inlet 9, between the back wall of the bowl and the trap 2, and terminating in the jet 11 directed into the trap 2, so that the water passing down through the passage 10 and discharging from the jet 11 will create an ejector action to discharge the water by suction from the bowl.

A spud 12 is secured through the partition 7 and communicates with the inlet 9 for delivering water to the bowl, and a suction pipe 13 has its upper end connected with said spud and its lower end is upturned within the lower portion of the tank and is provided with a seat 14 for a float valve 15. The suction pipe 13 permits the water to pass upwardly from the lower portion of the tank through the outlet 12 of the tank into the bowl, with the seat or inlet end 14 of the pipe 13 below the normal water level in the bowl.

The water is supplied through the supply pipe 16 which may enter the tank at any suitable point, and a valve casing 17 in the tank is connected to the discharge end of the pipe 16. An injector nozzle 18 extends from the casing 17 into the spud or port 12 between the tank and bowl, so that water discharged from said nozzle will create suction in the pipe 13 for raising the water through said suction pipe, thereby delivering a comparatively large volume of water quickly to the bowl by the injector action.

A valve plunger 19 is slidable in the casing 17 to normally close the port 20 between the pipe 16 and nozzle 18, and the plunger 19 is connected by a link 21 with a lever 22 that is operated manually for lifting the plunger 19 to open position.

A lever 23 pivoted to the valve casing 17 is engaged by the plunger 19 and controls the float valve 15. A wire 24 connected to the lever 23 has an eye 25 slidable on the stem 26 of the float valve 15, and said stem has an eye 27 slidable on the wire 24, so that when the lever 23 is swung upwardly by the opening movement of the plunger 19, the eye 25 contacting with the eye 27 will lift the valve 15, thereby starting the flow of water into the pipe 13 when the flow of water from the supply pipe is delivered through the nozzle 18.

When the valve 15 is unseated its buoyancy will prevent it from being seated until the water level in the tank is lowered to the seat 14.

A latch or dog 28 is pivoted to the casing 17 to engage in notches 29 in the plunger 19 for latching said plunger in either closed or open position, and a downwardly extending arm 30 is connected to said latch and has a float 31 thereon the center of which is located slightly above the level of the seat 14, so that when the tank is emptied the float 31 will swing with the arm or rod 30 to move the latch 28 to releasing position and permit the plunger 19 to move to closed position, the arm or lever 22 being influenced by a spring 22ˣ to move downwardly.

The valve casing 17 has an outlet 32 from which a hush pipe 33 leads downwardly into the tank for supplying water into the tank, and said casing has the valve seats 34 and 35 between the supply pipe 16 and outlet 32.

A valve plunger 36 is slidable in the valve casing to seat against the lower seat 35 to normally close the passage between the supply pipe 16 and outlet 32, and a lever 37 pivoted to the valve seat has a float 38 at the water level in the tank when the tank is filled, so that the lever 37 is swung upwardly to seat the plunger 36, thereby preventing water from entering the tank after the tank is filled.

A valve member 39 is connected to the plunger 19 and is seatable against the seat 34 when the plunger 19 is moved open, thereby shutting off the flow of water from the pipe 16 to the outlet 32 when the plunger 19 is opened, so that all of the water from the supply pipe 16 is delivered through the nozzle 18 to make the flushing action more effective.

In operation, the valve plungers 19 and 36 and float valve 15 are normally seated, the latch 28 engaging in the upper notch 29 to hold the plunger 19 seated.

When the lever 22 is raised it opens the valve plunger 19, and the latch 28 is moved to engage in the lower notch 29, for holding the plunger 19 open, the float 31 tending to move upwardly so as to hold the latch 28 yieldingly in the notches 29.

When the plunger 19 is opened the valve member 39 is moved against the seat 34, and the water from the supply pipe 16 is discharged through the nozzle 18 into the bowl inlet 9, thereby discharging the water into the bowl rim 3 and jet passage 10. The lever 23 being moved upwardly with the plunger 19 will unseat the float valve 15, thereby starting the flow of water from the tank through the pipe 13, and the normal water level in the tank is above the port 12, so that the water will flow upwardly through the pipe 13, at the start, under pressure, assisted by the injector action, thereby delivering the water from the tank into the bowl in a large volume and rapidly, to facilitate the flushing action.

The water delivered into the rim 3 passes down the slot 4 along the walls of the bowl, and the water delivered through the passage 10 discharges from the jet 11 into the trap 2 to create an ejector action for discharging the water from the bowl rapidly. The water is thus injected into and ejected from the bowl to produce an efficient flushing action. After the flushing action takes place, there is sufficient water remaining which runs down and fills the lower portion of the bowl to provide the water seal.

When the water level in the tank is lowered to the seat 14, the valve 15 is seated, thereby shutting off further discharge of water from the tank, and the float arm 30 swinging downwardly will release the latch 28 from the plunger 19, so that said plunger is seated, thereby shutting off the water from the nozzle 18, and opening the valve member 39. The plunger 36 having been moved open when the water level in the tank was lowered, will now permit water to flow from the supply pipe 16 to and through the outlet 32 into the tank, so as to fill the tank. The float 31 is raised to move the latch 28 into the upper notch 29, and when the water reaches its high level in the tank, the float 38 being raised will seat the plunger 36, thereby shutting off the flow of water into the tank.

Figure 2:
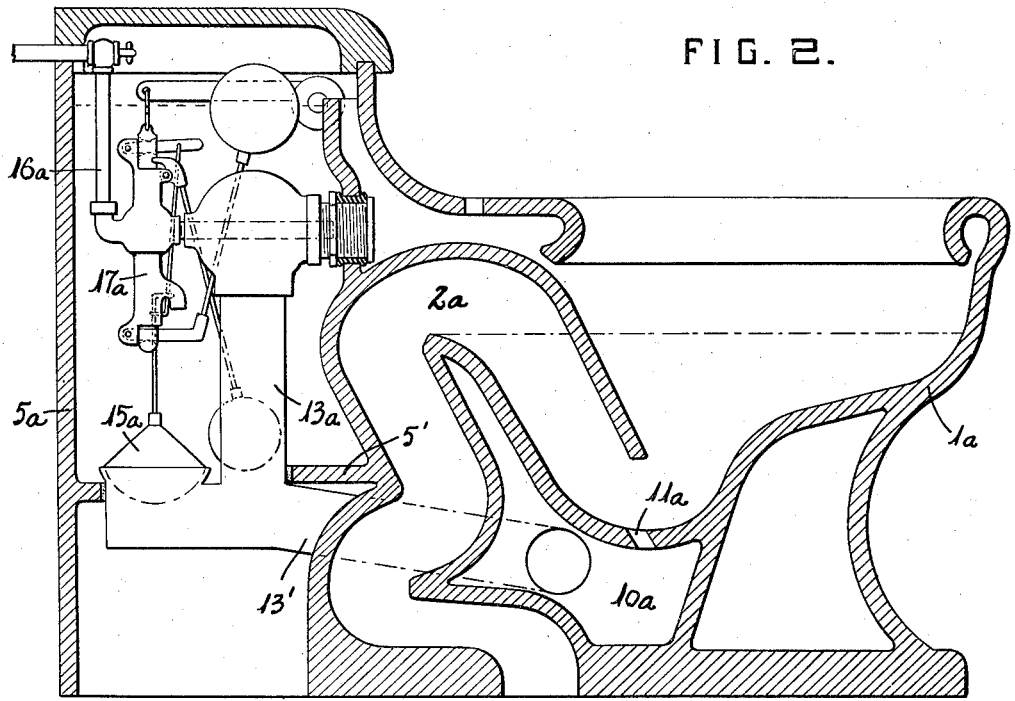
Figs. 2, 3, 4 and 5 are sectional views illustrating modifications.

Fig. 2 illustrates a modification in that the bowl 1ᵃ has a jet chamber 10ᵃ below the trap 2ᵃ with an outlet jet aperture 11ᵃ directed upwardly into the trap, so that water is discharged from the chamber 10ᵃ through the aperture 11ᵃ into the trap to provide the ejector action.

The suction pipe 13ᵃ has a branch 13′ communicating with the chamber 10ᵃ, so that when the float valve 15ᵃ is opened water flows through the pipe 13ᵃ into the bowl and also through the branch 13′ into the chamber 10ᵃ.

As shown, the tank 5ᵃ has a false bottom 5′ through which the suction pipe 13ª is cemented or otherwise secured. The supply pipe 16ª is also shown as extending downwardly in the tank 5ª to the valve casing 17ª.

Figure 3:
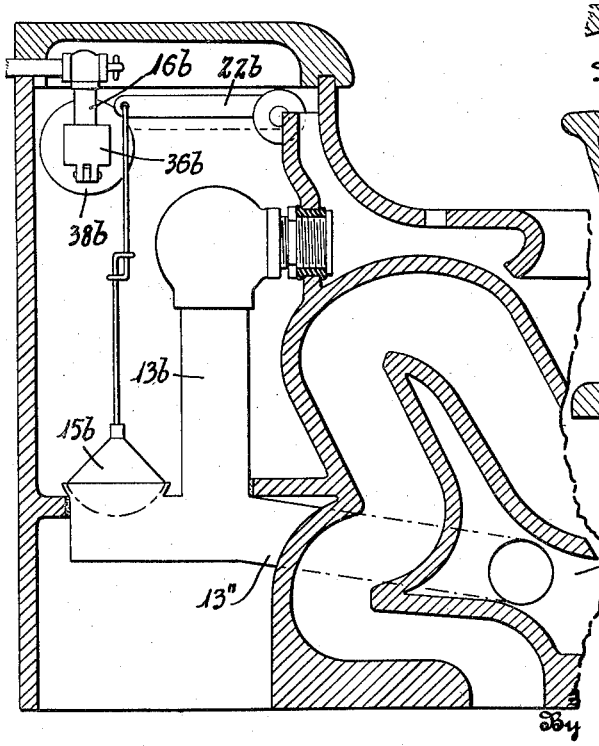

Fig. 3 illustrates a tank and bowl structure according to Fig. 2, with the water injector means omitted, so that the water flows under pressure through the pipe 13ᵇ when the valve 15ᵇ is unseated, due to the water level in the tank being higher than the outlet end of the pipe 13ᵇ, and the suction created in the bowl by the ejector action will assist in raising the water through said pipe 13ᵇ.

Part of the water flows through the branch 13″ of the pipe 13ᵇ into the jet chamber 10ᵇ.

The lever 22ᵇ merely raises the valve 15ᵇ, and the flow of water into the tank is controlled by a suitable valve 36ᵇ controlled by the float 38ᵇ, to shut off the flow of water from the supply pipe 16ᵇ into the tank when the tank is filled, the water being delivered into the tank when the float 38ᵇ is lowered, so that water flows into the tank during and after the flushing action, until the tank is filled.

Figure 4:
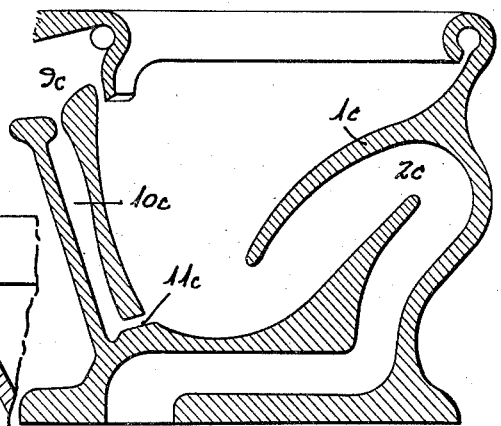

Fig. 4 illustrates another type of bowl with which the improvements may be used, the trap 2ᶜ being disposed at the front of the bowl 1ᶜ, and the jet passage 10ᶜ which leads downwardly from the bowl inlet 9ᶜ has a jet aperture 11ᶜ directed forwardly into the inlet of the trap. The improvements may be embodied in various types of bowls and traps with which the tank is combined, and in some cases the suction pipe may be integral with the bowl and tank structure. Various other changes can be made in the construction and arrangement of parts, within the scope of what is hereinafter claimed.

Figure 5:
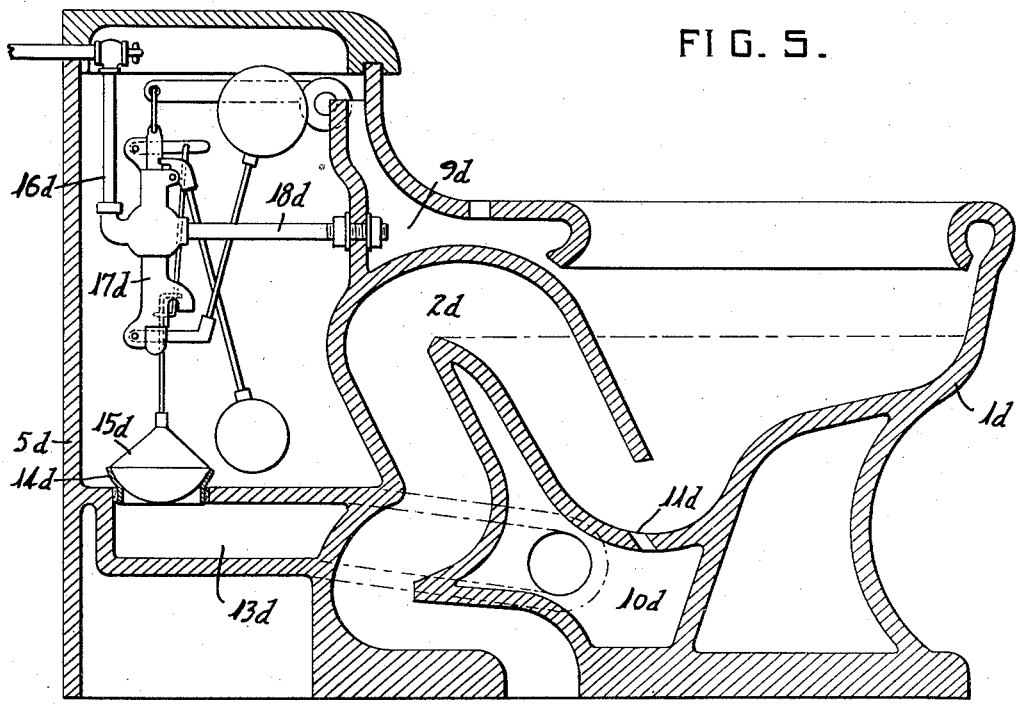

Fig. 5 illustrates the water nozzle 18ᵈ opening into the inlet chamber 9ᵈ of the bowl, and the tank and bowl have an integral passage 13ᵈ leading from the bottom of the tank to the jet chamber 10ᵈ from which the aperture 11ᵈ is directed into the trap 2ᵈ of the bowl 1ᵈ. The bottom of the tank has a seat 14ᵈ at the inlet end of the passage 13ᵈ in which the float valve 14ᵈ is seatable.

When the valve 17ᵈ is opened the water flows from the supply pipe 16ᵈ through the nozzle 18ᵈ into the inlet chamber 9ᵈ, and the valve 15ᵈ being opened lets the water flow from the tank into the jet chamber 10ᵈ.

In each embodiment of the invention, the tank and bowl are cast integral, and are adapted to fit snugly within the corner between and against the floor and wall of a building.

Having thus described the invention, what is claimed as new is:

1. A closet comprising a bowl having an inlet cavity, a water tank constructed as a unit with the bowl, said bowl and tank having an upstanding partition between them adjacent to said cavity and forming an overflow passage from the tank into said cavity, and means for discharging water from within the tank into said cavity and communicating through said partition.

2. A closet comprising a bowl having an ejector jet, a tank, a water passage leading upwardly from the lower portion of the tank to the bowl and having a branch leading to said jet, an injector nozzle extending into said passage and discharging into the bowl, a float valve controlling the inlet end of said passage, a water supply pipe connected to said nozzle, a valve controlling the flow from said pipe through the nozzle, and means for simultaneously unseating said float valve and opening the second named valve.

3. A closet comprising a bowl, a tank, a water passage leading from the tank to the bowl, a float valve controlling said passage, a water supply pipe communicating with the tank, a nozzle communicating with the supply pipe and discharging into the bowl, a normally closed valve between said pipe and nozzle, means for unseating the float valve and opening the secondnamed valve, a float controlled valve for shutting off the flow from the supply pipe into the tank when the tank is filled, and a valve operable with the secondnamed valve for shutting off the flow from said pipe into the tank when the secondnamed valve is opened.

4. A closet comprising a bowl, a tank, a water passage leading from the tank to the bowl, a float valve controlling said passage, a water supply pipe communicating with the tank, a nozzle communicating with the supply pipe and discharging into the bowl, a normally closed valve between said pipe and nozzle, means for unseating the float valve and opening the secondnamed valve, a float controlled valve for shutting off the flow from the supply pipe into the tank when the tank is filled, a valve operable with the secondnamed valve for shutting off the flow from said pipe into the tank when the secondnamed valve is opened, and float controlled means for holding the secondnamed valve open and the fourthnamed valve closed until the tank is emptied.

5. A closet comprising a bowl, a tank, a water passage leading from the tank to the bowl, a float valve controlling said passage, a water supply pipe communicating with the tank, a nozzle communicating with the supply pipe and discharging into the bowl, a normally closed valve between said pipe and nozzle, means for unseating the float valve and opening the secondnamed valve, a float controlled valve for shutting off the flow from the supply pipe into the tank when the tank is filled, a valve operable with the secondnamed valve for shutting off the flow from said pipe into the tank when the secondnamed valve is opened, a latch for holding the secondnamed valve open and the fourthnamed valve closed, and a float connected to said latch for holding the latch in latching position until the tank is emptied.

In testimony whereof I hereunto affix my signature.

WILLIAM C. H. JOINER, Jr.